(12) United States Patent
Qiu

(10) Patent No.: US 9,936,257 B2
(45) Date of Patent: Apr. 3, 2018

(54) APPLICATION DISPLAY METHOD AND TERMINAL

(71) Applicant: TENCENT TECHNOLOGY (SHENZHEN) COMPANY LIMITED, Shenzhen (CN)

(72) Inventor: Zhengyuan Qiu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 525 days.

(21) Appl. No.: 14/475,476

(22) Filed: Sep. 2, 2014

(65) Prior Publication Data

US 2014/0372890 A1    Dec. 18, 2014

Related U.S. Application Data

(63) Continuation of application No. PCT/CN2013/071713, filed on Feb. 21, 2013.

(30) Foreign Application Priority Data

Mar. 2, 2012  (CN) .......................... 2012 1 0052872

(51) Int. Cl.
   *G06F 3/0484*  (2013.01)
   *H04N 21/472*  (2011.01)
   (Continued)

(52) U.S. Cl.
   CPC ..... *H04N 21/47217* (2013.01); *G06F 3/0481* (2013.01); *G06F 3/0484* (2013.01);
   (Continued)

(58) Field of Classification Search
   CPC ........... H04N 21/47217; H04N 21/472; H04N 21/4312; G06F 3/0481; G06F 3/0484; G06F 9/4443
   See application file for complete search history.

(56) References Cited

U.S. PATENT DOCUMENTS 5,539,479 A * 7/1996 Bertram .............. G06F 3/03548
                                                       345/158
5,602,597 A * 2/1997 Bertram ............. H04N 5/44543
                                                       345/158
(Continued)

FOREIGN PATENT DOCUMENTS

CN      101500125 A    8/2009
CN      102207825 A    10/2011
(Continued)

OTHER PUBLICATIONS

JP Office Action dated Nov. 30, 2015 re: Application No. 2014-559072; pp. 1-9.
(Continued)

*Primary Examiner* — Shen Shiau
(74) *Attorney, Agent, or Firm* — Cantor Colburn LLP

(57) ABSTRACT

The present disclosure discloses a method and terminal for displaying an application. According to an example, in the method, a terminal creates a user interface (UI) operation controller and an UI operation window for an application when receiving an operation command from a user for the application, wherein when a video displaying command for a video application is received, the created UI operation controller is a video decoder, the created UI operation window is a video displaying window and the video displaying window is displayed in a designated area in a UI provided by the terminal, when the UI operation window for another application is received, the entire UI operation window covers the entire designated area and has a same size with the designated area, or the entire UI operation window is within the designated area. The terminal configures an attribute of the UI operation window with transparency and semi-transparency, and configures the UI operation window on the video displaying window when both the video displaying window and the UI operation window are
(Continued)

displayed in the UI. According to the technical solution of the present disclosure, utilization of a screen in the terminal is improved.

11 Claims, 2 Drawing Sheets

(51) Int. Cl.
*H04N 21/431* (2011.01)
*G06F 3/0481* (2013.01)
*G06F 9/44* (2018.01)

(52) U.S. Cl.
CPC ....... *H04N 21/4312* (2013.01); *H04N 21/472* (2013.01); *G06F 9/4443* (2013.01); *G06F 2203/04804* (2013.01)

(56) References Cited

U.S. PATENT DOCUMENTS

| | | | | |
|---|---|---|---|---|
| 5,651,107 | A * | 7/1997 | Frank | G06F 3/0481 345/589 |
| 5,684,804 | A * | 11/1997 | Baronetti | H04N 21/2368 370/509 |
| 5,768,539 | A * | 6/1998 | Metz | G06F 8/60 348/E5.006 |
| 5,896,140 | A * | 4/1999 | O'Sullivan | G09G 5/395 345/536 |
| 5,903,261 | A * | 5/1999 | Walsh | G09G 5/397 345/418 |
| 7,757,252 | B1 * | 7/2010 | Agasse | H04N 5/44543 715/700 |
| 2002/0042920 | A1 * | 4/2002 | Thomas | G06F 3/0481 725/87 |
| 2002/0073123 | A1 | 6/2002 | Tsai | |
| 2004/0201608 | A1 * | 10/2004 | Ma | G06F 3/0481 715/719 |
| 2005/0166232 | A1 * | 7/2005 | Lamkin | G06F 17/30017 725/43 |
| 2005/0278648 | A1 | 12/2005 | Taylor | |
| 2007/0124692 | A1 | 5/2007 | Lindsay et al. | |
| 2008/0215999 | A1 | 9/2008 | Kim et al. | |
| 2009/0193355 | A1 * | 7/2009 | Tada | G06F 3/0481 715/790 |
| 2009/0204711 | A1 * | 8/2009 | Binyamin | H04L 67/16 709/226 |
| 2009/0249393 | A1 * | 10/2009 | Shelton | H04N 5/445 725/39 |
| 2009/0262122 | A1 * | 10/2009 | Darsa | G09G 5/14 345/545 |
| 2010/0182505 | A1 * | 7/2010 | Jilagam | H04N 7/0122 348/553 |
| 2010/0257569 | A1 * | 10/2010 | O'Hanlon | G11B 27/10 725/110 |
| 2010/0269030 | A1 | 10/2010 | Dugonjic et al. | |
| 2011/0093891 | A1 * | 4/2011 | Nakamura | H04N 21/4122 725/38 |
| 2012/0144424 | A1 * | 6/2012 | Ganesan | H04N 21/42204 725/40 |
| 2013/0027425 | A1 | 1/2013 | Yuan | |
| 2013/0279877 | A1 * | 10/2013 | Boak | H04N 5/917 386/231 |

FOREIGN PATENT DOCUMENTS

| | | |
|---|---|---|
| CN | 102301736 A | 12/2011 |
| JP | 2008519483 A | 6/2008 |
| JP | 2014504760 A | 2/2014 |
| WO | 2006052304 A1 | 5/2006 |
| WO | 2011121171 A1 | 10/2011 |

OTHER PUBLICATIONS

EP Search Report dated Jan. 9, 2015 re: Application No. PCT/CN2013/071713; citing: US 2002/073123 A1, US 2005/278648 A1, U.S. Pat. No. 5,651,107 A and US 2007/124693 A1; pp. 1-8.
International Preliminary Report on Patentability dated Sep. 12, 2014 re: Application No. PCT/CN2013/071713; citing: CN101500125 A; pp. 1-26.
International Search Report dated May 23, 2013 re: PCT/CN2013/071713; citing: CN 101500125 A, CN 102301736 CN 102207825 A, WO 2011121171 A1 and US 2010269030 A1.

* cited by examiner

US 9,936,257 B2

APPLICATION DISPLAY METHOD AND TERMINAL

CROSS REFERENCE TO RELATED APPLICATIONS

This application is a continuation of Application No. PCT/CN2013/071713, filed on Feb. 21, 2013, which claims the benefit of and priority to Chinese Patent Application No. 201210052872.3, entitled "method and terminal for displaying an application" and filed on Mar. 2, 2012. The content of each of said applications are incorporated herein by reference in their entirety for all purposes.

FIELD OF THE INVENTION

The method relates to a terminal technology, and more particular, to a method and terminal for displaying an application.

BACKGROUND OF THE INVENTION

In mobile terminals such as phones, since computing capabilities and network transmission capabilities are limited, videos are only displayed in front windows.

The screens in the mobile terminals are usually small. Thus, when the windows occupy most, even the entire screens, other applications will not be displayed at the same time. Thus, the utilization of the screens in the mobile terminals is reduced.

SUMMARY OF THE INVENTION

A method and terminal for displaying an application are provided according to examples of the present disclosure, so as to improve utilization of a screen in a terminal.

A method for displaying an application includes:

creating, by a terminal, a video decoder and a video displaying window when receiving a video displaying command from a user;

obtaining, by the video decoder, video data, transmitting the video data decoded to be displayed in the video displaying window after the video data is decoded;

creating, by the terminal, a UI operation controller and a UI operation window when receiving an operation command for another application from the user, wherein a size and a start location of the UI operation window are the same as a size and a start location of the video displaying window, or an area where the entire UI operation window locates is within an area where the video displaying window locates;

creating, by the UI operation controller, a window element to be displayed in the UI operation window, responding an operation from a user for the UI operation window; and configuring, by the terminal, an attribute of the UI operation window with transparency, and configuring the UI operation window on the video displaying window when both the video displaying window and the UI operation window exists at the same time.

A terminal includes a receiving module and a creating module.

The receiving module is to receive an operation command from a user, transmit the operation command to the creating module;

The creating module is to when a video displaying command from the user is received, create a video decoder and a video displaying window, wherein the video displaying window is in a designated area in a user interface (UI) provided by the terminal; create a UI operation controller and a UI operation window when receiving an operation command for another application, wherein the entire UI operation window covers the entire designated area and has a same size with the designated area, or the entire UI operation window is within the designated area; configure an attribute of the UI operation window with transparency and semi-transparency, and configure the UI operation window on the video displaying window when both the video displaying window and the UI operation window are displayed in the UI.

It can be seen from the above that, according to the technical solution of the present disclosure, a video being displayed is taken as a background of another application other than a video application, and the application other than the video application is displayed on the background of the video being displayed. Thus, a video application and the application other than the video application may be displayed on the screen of the terminal at the same time, so as to improve utilization of the screen of the terminal. Moreover, in a conventional technology, a static image is taken as the background of the application, e.g., a blank background, a specific color background or an image background, which is much monotonous. According to technical solution of the present disclosure, a dynamic image is taken as the background, so that a form of the background is much rich. In addition, the technical solution is simple for implementation and easy for popularization and promotion.

DETAILED DESCRIPTION OF THE INVENTION

A method for displaying an application is provided for a problem existing in a conventional technology according to an example of the present disclosure. According to an example, in the method, a background of another application is configured with a video being displayed, and the application rather than a video application is displayed on the background of the video being displayed.

In order to make a technical solution clearer, the technical solution will be illustrated in detail with reference to drawings and examples as follows.

Figure 1:
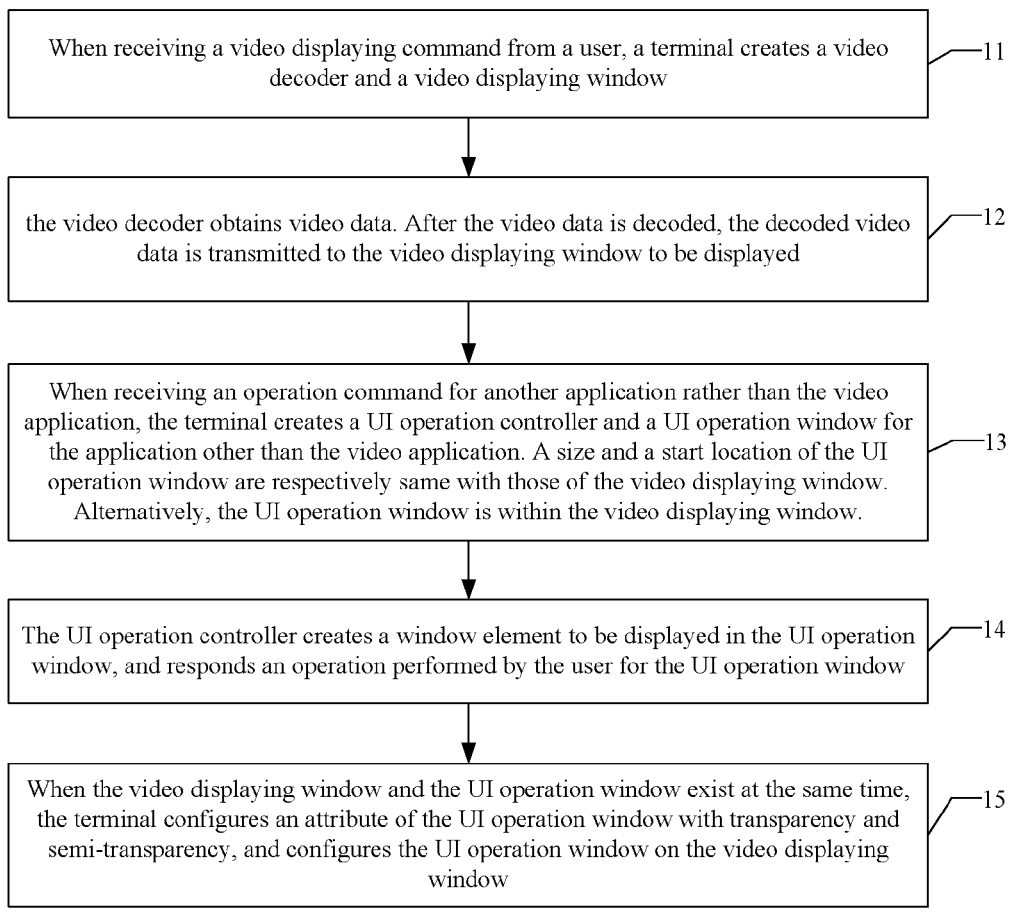
FIG. 1 is a flowchart illustrating a method for displaying an application according to an example of the present disclosure.

FIG. 1 is a flowchart illustrating a method for displaying an application according to an example of the present disclosure. As shown in FIG. 1, the method includes the following procedures.

At block 11, when receiving a video displaying command from a user, a terminal creates a video decoder and a video displaying window, wherein the video displaying command is an operation command for a video application, the video decoder is a UI (User Interface) operation controller for the video application, the video displaying window is a UI operation window of the video application. The UI operation controller is a program for controlling content displayed in the UI, or accepting and responding an operation of the user on the UI.

The video application includes: a point-to-point real-time video communication application, a video-on-demand programming application and a local video application.

When receiving the video displaying command from the user, the terminal respectively creates the video decoder and the video displaying window. In additional, the terminal further creates a video controller.

The video displaying window occupies a designated area in the UI provided by the terminal. In an example, the video displaying window may occupy the entire UI, and the UI occupies the entire screen in the terminal.

In an example that the UI occupies the entire screen in the terminal, a start location (StartLeft, StartTop) is an upper left corner of the screen. A size (width, height) is a size of the entire screen. That is, StartLeft=0, StartTop=0;
Width=Width Of Window, Height=Height Of Window;
wherein "Width Of Window" refers to a width of the screen, "Height Of Window" refers to a height of the screen.

At block 12, the video decoder obtains video data. After the video data is decoded, the decoded video data is transmitted to the video displaying window to be displayed.

If the video controller is created at block 11, the video controller may create a window element to be displayed in the video displaying window, and respond an operation for the video displaying window.

The video controller may include a control function related with interaction with the UI and a set of status parameters.

The status parameters may include the window element to be displayed in the video displaying window, e.g., a text, a picture, a button, and an attribute value of the window element, e.g., a location, a size, text content, and picture content. The control function may include a response function for a user's operation.

Based on information above, the video controller may create a window element to be displayed in the video displaying window and responds a user's operation for the window element being displayed in the video displaying window, e.g., responding fast forwarding, responding pausing.

After obtaining the video data, the video decoder may decode the video data, and then transmit the decoded video data to the video displaying window to be displayed.

The process that the video decoder obtains the video data may include the video decoder reading the video data stored. The process that the video decoder obtains the video data may also include the video decoder receiving the video data inputted via a hardware device.

In an example, when the video is displayed in local, the video decoder may read the video data from a corresponding directory. In another example, when the point-to-point real-time video communication application is performed, the video controller may receive external video data, e.g., the video data inputted from a camera.

At block 13, when receiving an operation command for another application rather than the video application, the terminal creates a UI operation controller and a UI operation window for the application other than the video application. A size and a start location of the UI operation window are respectively same with those of the video displaying window. Alternatively, the UI operation window is within the video displaying window. The application other than the video application excludes the application that competes to use a same hardware in the terminal with the video application. The application may include an instant messaging application, a webpage browsing application, a document (e.g., word/PDF) processing application, an image processing application, a game application.

When receiving the operation command for the application other than the video application, e.g., receiving the operation command for the instant messaging application, the UI operation controller (e.g., a programming for displaying data and controlling data transmission for an instant messaging tool) and the UI operation window (e.g., an instant messaging charting window) are respectively created for the instant messaging application.

The size and the start location for the UI operation window may be same as those of the video displaying window. That is, if the start location of the video displaying window is StartLeft=0, StartTop=0, the start location of the UI operation window is also StartLeft=0, StartTop=0. If the size of the video displaying window is Width=Width Of Window, Height=Height Of Window, the size of the UI operation window is Width=Width Of Window, Height=Height Of Window.

In addition, the area located by the UI operation window may be within the area of the video displaying window. The former method is usually adopted.

At block 14, the UI operation controller creates a window element to be displayed in the UI operation window, and responds an operation performed by the user for the UI operation window.

The UI operation controller may include a control function related with interaction with a UI and a set of status parameters.

At block 15, when the video displaying window and the UI operation window exist at the same time, the terminal configures an attribute of the UI operation window with transparency and semi-transparency, and configures the UI operation window on the video displaying window.

When the video displaying command and the operation command for the application other than the video application (named as "application X" at block 15) are received, the video displaying window and the UI operation window exist at the same time.

In an example, the terminal may only receive the video displaying command. In another example, the terminal may only receive the operation command for the application X. In another example, the terminal may receive both the video displaying command and the operation command for the application X. When receiving a corresponding command, the terminal may perform a corresponding process as described above.

In the condition that both the video displaying command and the operation command for the application X are received, there are three subcases that: 1) the video displaying command is received firstly, and then the operation command for the application X is received; 2) the operation command for the application X is received firstly, and then the video displaying command is received; 3) the video displaying command and the operation command for the application X are received at the same time, e.g., a video displaying function and a text charting function may be integrated in a software, the video displaying command and the operation command for the application X are received at the same time when the software is started.

In any of the subcases 1), 2), 3), when both the video displaying command and the operation command for the application X are received, except that a corresponding procedure is performed according to the method above, the terminal may further configure the attribute of the UI operation window with transparency, and configure the UI operation window on the video displaying window. That is, the video being displayed may be a background for the application X, the application X is presented on the background of the video being displayed.

Figure 2:
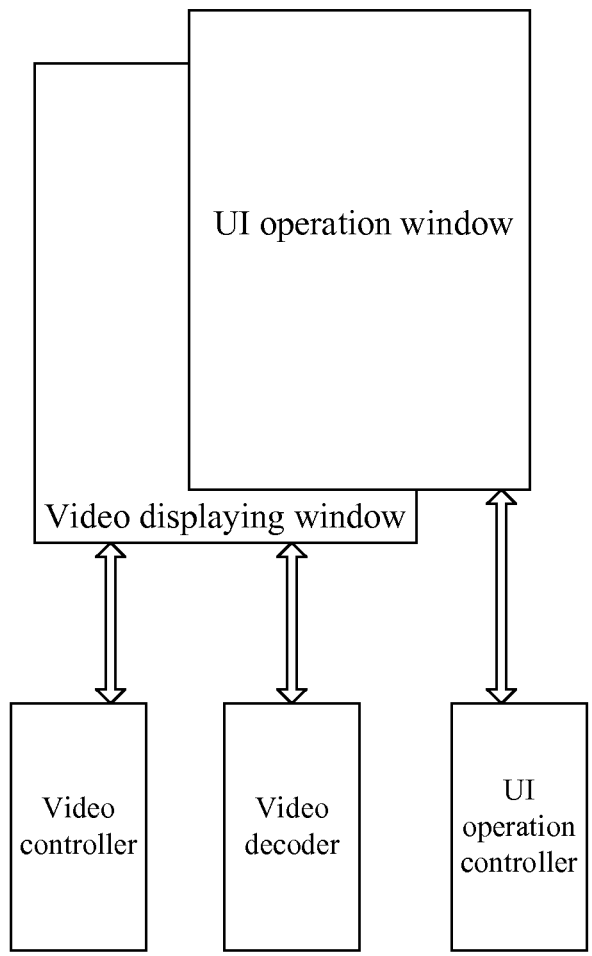
FIG. 2 is a schematic diagram illustrating relationships among various elements created according to an example in FIG. 1 of the present disclosure.

FIG. 2 is a schematic diagram illustrating relationships among various elements created according to an example in FIG. 1 of the present disclosure. As shown in FIG. 2, the size and the start location of the UI operation window are the same as those of the video displaying window. A description way as shown in FIG. 2 may make the UI operation window distinguished from the video displaying window.

In addition, numbers for various blocks in FIG. 1 are used for brief instructions, but are not for limiting the technical solution of the present disclosure. In an example, a process at block 11 may be performed after the process at block 13. In another example, the process at block 11 and the process at block 13 may be performed at the same time.

The video decoder, the video controller, the video displaying window, UI operation controller and the UI operation window may be created according to methods in the conventional technology.

So far, the example of the present disclosure ends.

Figure 3:
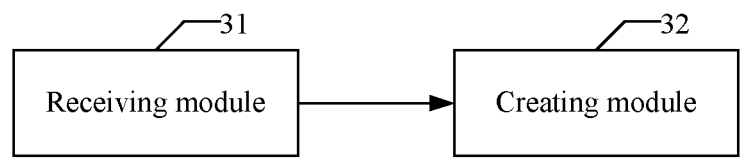
FIG. 3 is a schematic diagram illustrating a structure of a mobile terminal according to an example of the present disclosure.

FIG. 3 is a schematic diagram illustrating a structure of a terminal according to an example of the present disclosure. As shown in FIG. 3, the terminal includes a receiving module 31 and a creating module 32.

The receiving module 31 is to receive an operation command from a user, and transmits the operation command to the creating module 32.

The creating module 32 is to creating a video decoder and a video displaying window when receiving a video displaying command for a video application, wherein the video decoder is to obtain video data and transmit the video data to be displayed in the video displaying window after the video data is decoded.

When receiving an operation command for another application rather than the video application, the creating module 32 is to create a UI operation controller and a UI operation window for the application other than the video application. A size and a start location of the UI operation window are respectively same with those of the video displaying window, or, an area where the UI operation window locates is within an area where the video displaying window locates. The creating module 32 is to create a window element to be displayed in the UI operation window and respond an operation from the user for the UI operation window through the UI operation controller.

When the video displaying window and the UI operation window exists at the same time, the creating module 32 is to configure an attribute of the UI operation window with transparency, and configure the UI operation window overlaid on the video displaying window.

In an example, the video displaying window may occupy the entire UI. The UI may occupy the entire screen of the terminal.

The video application includes: a point-to-point real-time video communication application, a video-on-demand programming application and a local video application.

The creating module 32 is further to create a video controller when the video decoder and the video displaying window are created, create a window element to be displayed in the window displaying window and respond an operation performed for the video displaying window by the user through the video controller.

A method described in the method example above may apply to the terminal as shown in FIG. 3, which is not described repeatedly herein.

The terminal as shown in FIG. 3 may be a mobile terminal, e.g., a phone, a laptop, a tablet PC, a POS (Point of Sales) machine, an on-board computer. The terminal may also be a terminal not moved, e.g., a desktop computer and a server, to which the technical solution may apply.

In addition, the technical solution according to the present disclosure may apply to:

a produce for a point-to-point video communication, another application is displayed on a background of a video being displayed, e.g., displaying a synchronized text chat with others;

a produce for displaying a video, e.g., a produce for displaying a video-on-demand programming or a local video, another application is displayed on a background of the video being displayed, e.g., gaming;

a produce for point-to-point real-time text chart, a video function may be added to the produce and the point-to-point real-time text chart may be displayed on a background of a video being displayed.

The technical solution according to the present disclosure may apply to another produce, which are not described repeatedly herein.

It can be seen from the above that, according to the technical solution of the present disclosure, a video being displayed is taken as a background of another application other than the video application, and the application other than the video application is displayed on the background of the video being displayed. Thus, a video displaying application and the application other than the video application may be displayed on the screen of the terminal at the same time, so as to improve utilization of the screen of the terminal. Moreover, in a conventional technology, a static image is taken as the background of the application, e.g., a blank background, a specific color background or an image background, which is much monotonous. According to technical solution of the present disclosure, a dynamic image is taken as the background, so that a form of the background is much rich. In addition, the technical solution is simple for implementation and easy for popularization and promotion.

Based on the technical solution provided according to examples of the present disclosure, a machine readable storage medium is provided to store instructions for a machine to execute a method for displaying an application according to the present disclosure. In detail, a system or an apparatus with a storage medium may be provided. Codes of software program for executing functions of any of examples of the present disclosure, so that a computer (or a CPU or a MPU) in the system or the apparatus reads and execute the codes of the program stored in the storage medium.

In this condition, the codes of the program read from the storage medium may implement functions of any of examples. Thus, the codes of the program and the storage medium storing the codes of the program are a part to implement the technical solution for displaying an application.

In an example, the storage medium for storing the codes of the program includes a floppy disk, a hard disk, a magneto-optical disk, an optical disk (e.g., CD-ROM, CD-R, CD-RW, DVD-ROM, DVD-RAM, DVD-RW, DVD+RW), a magnetic tape, a nonvolatile memory card, and ROM. Optionally, the codes of the program may be downloaded from a computer as a server through a communication network.

In addition, it should be noted that all or part of practical operations may be implemented by executing the codes of the program read by the computer. Alternatively, an operating system in a computer can be indicated to implement all or part of practical operations through instructions based on the codes of the program. Thus, functions of any of examples above according to the present disclosure can be implemented.

In addition, it should be noted that the codes of the program read from the storage medium may be written into memory in an expansion board inserted into the computer, afterwards, the instructions based on the codes of the program may make a CPU installed in the expansion board or an expansion unit execute all or part of practical operations.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A method for displaying an application, comprising:
   creating, by a terminal, a video decoder and an video displaying window when receiving a video displaying command for a video application from a user,
   when receiving an operation command for a second application rather than the video application, creating a User Interface (UI) operation controller and a UI operation window for the second application other than the video application;
   configuring, by the terminal, an attribute of the UI operation window for the second application with transparency and semi-transparency, and displaying the UI operation window for the second application on the video displaying window, wherein the UI operation window for the second application has a same size and a start location with the video displaying window, or is within the video displaying window;
   the method further comprising:
   creating, by the terminal, a video controller when creating the video decoder and the video displaying window;
   creating, by the video controller, a window element to be displayed in the video displaying window, responding an operation from the user for the window element being displayed in the video displaying window.

2. The method of claim 1, wherein the designated region occupies the entire or part of the UI.

3. The method of claim 1, further comprising:
   obtaining, by the video decoder, video data, transmitting the video data decoded to the video displaying window to be displayed after the video data is decoded.

4. The method of claim 3, wherein obtaining the video data comprises:
   reading, by the video decoder, the video data stored in the terminal; or
   receiving, by the video decoder, the video data inputted via a hardware device in the terminal.

5. The method of claim 1, wherein the first application comprises a point-to-point real-time video communication application, a video-on-demand programming application and a local video application.

6. The method of claim 1, further comprising:
   creating, by the UI operation controller, a window element to be displayed in the UI operation window after the UI operation controller is created, responding an operation from the user for the window element being displayed in the UI operation window.

7. A terminal, comprising:
   a processor for executing modules stored in a memory, the modules comprise a receiving module and a creating module:
   the receiving module, to receive video displaying command for a video application from a user, transmit the video displaying command to the creating module; receive an operation command for a second application rather than the video application, and transmit the operation command for the second application to the creating module;
   the creating module, to when the video displaying command from the user is received, create a video decoder and a video displaying window, when the operation command for the second application is received, create a User Interface (UI) operation controller and a UI operation window for the second application other than the video application;
   configure an attribute of the UI operation window for the second application with transparency or semi-transparency, and display the UI operation window for the second application on the video displaying window, wherein the UI operation window for the second application has a same size and a start location with the video displaying window, or is within the video displaying window;
   wherein the creating module is further to when the video decoder and the video displaying window are created, create a video controller, create a window element to be displayed in the video displaying window through the video controller, respond an operation from the user for the window element being displayed in the video displaying window through the video controller.

8. The terminal of claim 7, wherein the creating module is further to after the video decoder and the video displaying window are created, obtain video data, and transmit the video data decoded to the video displaying window to be displayed after the video data is decoded.

9. The terminal of claim 7, wherein the creating module is further to after the UI operation controller is created, create a window element to be displayed in the UI operation window through the UI operation controller, and respond an operation from the user for the window element being displayed in the UI operation window.

10. The terminal of claim 7, wherein the designated region occupies the entire or part of the UI.

11. The terminal of claim 7, wherein the first application comprises a point-to-point real-time video communication application, a video-on-demand programming application and a local video application.

* * * * *